US007651620B2

(12) United States Patent
Vion

(10) Patent No.: US 7,651,620 B2
(45) Date of Patent: Jan. 26, 2010

(54) PRESSURISED WATER RELEASING NOZZLE FOR GENERATING MICROBUBBLES IN A FLOTATION PLANT

(75) Inventor: Patrick Vion, Houilles (FR)

(73) Assignee: Degremont, Rueil-Malmaison (FR)

( * ) Notice: Subject to any disclaimer, the term of this patent is extended or adjusted under 35 U.S.C. 154(b) by 0 days.

(21) Appl. No.: 12/465,868

(22) Filed: May 14, 2009

(65) Prior Publication Data

US 2009/0218293 A1 Sep. 3, 2009

Related U.S. Application Data

(63) Continuation of application No. 10/575,165, filed as application No. PCT/FR2004/002510 on Oct. 5, 2004.

(30) Foreign Application Priority Data

Oct. 10, 2003 (FR) .................................. 03 11910

(51) Int. Cl.
*C02F 1/24* (2006.01)

(52) U.S. Cl. ........................ 210/703; 210/707; 261/76; 261/122.1

(58) Field of Classification Search ................. 210/703, 210/707; 261/76, 122.1
See application file for complete search history.

(56) References Cited

U.S. PATENT DOCUMENTS

| | | | | |
|---|---|---|---|---|
| 2,573,982 | A | | 11/1951 | Ofeldt |
| 2,585,429 | A | | 2/1952 | Boe |
| 3,784,111 | A | | 1/1974 | Piggott |
| 4,790,944 | A | * | 12/1988 | Gordon et al. .............. 210/706 |
| 5,154,351 | A | | 10/1992 | Takko |
| 5,332,100 | A | | 7/1994 | Jameson |
| 5,505,881 | A | * | 4/1996 | Eades et al. .................... 261/76 |
| 2003/0071372 | A1 | | 4/2003 | Gabl et al. |

FOREIGN PATENT DOCUMENTS

| | | | | |
|---|---|---|---|---|
| EP | 0 241 167 | A | | 10/1987 |
| EP | 0 659 690 | A | | 6/1995 |
| GB | 1444026 | A | * | 7/1976 |
| WO | WO-02/074440 | | | 9/2002 |
| WO | WO-03/064326 | | | 8/2003 |

* cited by examiner

*Primary Examiner*—Thomas M Lithgow
(74) *Attorney, Agent, or Firm*—Connolly Bove Lodge & Hutz LLP

(57) ABSTRACT

The inventive nozzle comprises a first releasing stage (1) for producing a pre-release by absorbing from 5 to 20% of available pressure, a second releasing stage (2) wherein a substantial release is carried out and the pressurised water passes from a saturation pressure to an output nozzle pressure, an intermediate chamber (3) in the form of a transition chamber in which the pressurised water approaches the saturation pressure by absorbing from 5 to 30% of the available pressure and an outlet tube (3) consisting of a sudden release and cavitation confinement tube whose minimum length (1) substantially corresponds to a distance separating the end of said tube on the second release stage side from a readhesion point of jets to the tube wall at the angle of divergence (alpha) thereof ranging from 3 to 12 DEG before readhesion.

5 Claims, 3 Drawing Sheets

Figure 1:
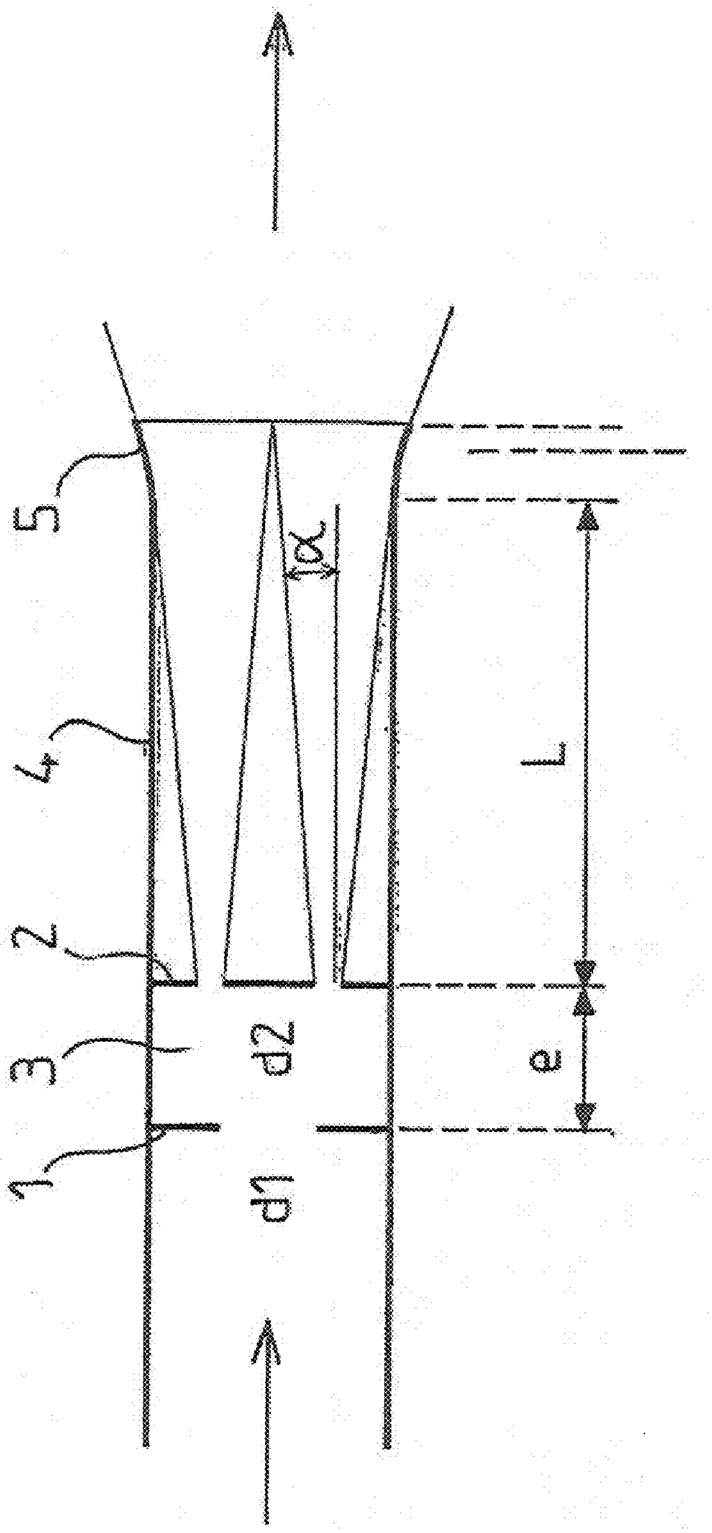

PRESSURISED WATER RELEASING NOZZLE FOR GENERATING MICROBUBBLES IN A FLOTATION PLANT

This application is a continuation of U.S. application Ser. No. 10/575,165 filed on Apr. 10, 2006; which is the National Stage of International Application No. PCT/FR04/002510 filed on Oct. 5, 2004; and this application claims priority of Application No. 0311910 filed in France on Oct. 10, 2003 under 35 U.S.C. § 119; the entire contents of all are hereby incorporated by reference.

The present invention relates to a pressure-reducing nozzle for generating microbubbles in a flotation cell.

Water treatment plants are known comprising a flotation cell into which raw water is admitted, previously flocculated then mixed with pressurized water and reduced in pressure so that the suspended solids contained in the raw water are entrained by the microbubbles resulting from this pressure reduction, then discharged, in the form of sludge, at the surface of the liquid contained in the cell, the treated water being discharged via the bottom of this cell. Such a plant is disclosed in particular in EP-A-0 659 690 and in WO 03/064326.

Flotation therefore constitutes a clarification technology (solid/liquid separation) which is an alternative to settling at least for some types of water.

According to this aforementioned technology, after the coagulation-flocculation stage, the water is mixed with an emulsion of microbubbles generally consisting of air (having an average diameter of between 30 and 80 μm). These microbubbles cling to the flocs which, lightened in this way, have a tendency to rise to the surface of the flotation cell where they accumulate to form a layer or bed of sludge. As mentioned above, the sludge is extracted at the surface of the flotation unit, while the clarified water is discharged via the bottom of the device.

A part of this clarified water (generally of the order of 10% of the water to be treated) is pumped at 4 or $6.10^5$ Pa into a special tank (called a pressurization tank) where the air is dissolved in great quantity (up to 5 times the maximum concentration of air in water at atmospheric pressure). During a sudden reduction in atmospheric pressure, the water is placed in a condition of supersaturation and generates microbubbles. This pressure reduction is created by static systems called pressure-reducing nozzles. These pressure-reducing nozzles are placed in a special zone where the microbubbles are mixed with the flocculated water.

To be physically separated from the water in a settling tank, a floc must be dense or large scale.

But to be separated by flotation, said floc just needs to be formed; it may be small and very light. Flocculation can therefore be simplified, hence the almost general absence of polymer for treating lightly laden water by flotation and the use of smaller flocculation reactors than those of settling tanks.

On the other hand, the microbubble generators must produce microbubbles of very small diameter with an energy dissipated into the medium compatible with the fragility of the floc.

Until now, flotation units were scarcely in a position to compete with the generation of fast lamellar settling tanks, with sludge or ballast layer, for the following reasons:

generally oversized volume of their flocculation zone, relatively low separation speeds, energy cost of pressurization.

However, over the last few years fast flotation units have appeared using co-current lamellar modules or special recovery systems. Speeds of 20 to 40 m/h are forecast. Moreover, flocculation times are coming down due to the targeted floc and higher performance technologies used.

In these circumstances of reduced flocculation time and high speeds in the flotation unit, flotation proves extremely competitive compared with settling tanks. This is the reason why this technology is currently making a strong comeback especially in the clarification of lightly laden water, on the grounds of compactness and ease of operation.

But with devices displaying such flocculation and separation speed performances, the microbubbles must be particularly suited in number and quality.

Reduced flocculation times require very fine microbubbles, the fragility of the flocs demands moderate mixing energies, high separation speeds do not allow a lack of active microbubbles.

These constraints have meant that in some instances industrial scale, conventional pressure-reducing nozzles have not enabled the expected performances to be attained.

For example, on semi-industrial scale pilots, small pressure-reducing nozzles (100 l/h to 500 l/h) have facilitated reaching separation speeds in the flotation cell of 30 m/h, while in an industrial plant equipped with larger pressure-reducing nozzles (1000 to 1500 l/h) the speed of the flotation unit could not exceed 20 m/h.

It was therefore necessary to develop a new nozzle better adapted to the requirements of industrial scale fast flotation units.

Currently there are numerous types of pressure-reducing nozzles for water clarification. In this connection, reference may be made to the article of E. M. Rykaart and J. Haarhoff (Wat. Sc. Tech. Vol. 31, No. 3-4, pp 25-35. 1995) entitled "Behaviour or air injection nozzles in dissolved air flotation" which mentions the main types of nozzles:

This article refers especially to nozzles characterized by:

- a dual pressure reduction (WRC and DWL nozzle) or a single pressure reduction (NIWR)
- a pressure reduction followed by a speed-damping chamber (NIWR and DWL)
- a pressure reduction followed by a divergent section for slowing the speed (hereafter referred to as the "B" nozzle).

The WRC nozzle is disclosed in particular in FR-P-1 444 026. It comprises:

- a first pressure reduction stage performing most of the pressure reduction, this stage being produced in the form of a diaphragm;
- an intermediate transfer and expansion chamber in which the gas (for example air) is practically desorbed thanks to the first pressure reduction stage and to the prevailing turbulence in this chamber. The height of this chamber is relatively large. By way of example, in the above mentioned patent, it is stated that this height is equal to the diameter of the orifice of the second pressure reduction stage.
- a second pressure reduction stage actually carrying out the transfer from a zone of high energy to a zone of low energy or low speed. This stage is produced in the form of a diaphragm whose orifice has a diameter that is always greater than that of the orifice of the first pressure reduction stage and preferably 2 times larger. The object of this invention is to obtain the lowest speeds possible at the nozzle outlet so as not to break up the flocs onto which the bubbles will cling.
- an outlet and diffusion pipe whose function is to protect the floc from still relatively high speeds at the diaphragm outlet and to obtain a sufficiently low speed at the pipe outlet.

Based on this state of the art (WRC nozzle), the invention provides a new nozzle for achieving quite unexpected hydraulic performances in industrial plants (large capacity nozzles>500 l/h) and especially operation at more than 30 m/h instead of 20 m/h with the "B" nozzle according to the prior state of the art.

Accordingly, this invention relates to a pressurized water pressure-reducing nozzle for generating microbubbles in a flotation plant comprising a first pressure reduction stage, an intermediate transfer chamber, a second pressure reduction stage and an outlet pipe, this nozzle being characterized in that:

- the first pressure reduction stage performs a preliminary pressure reduction by absorbing 5 to 20% of the available pressure;
- the second pressure reduction stage, in which most of the pressure reduction occurs, causes the pressurized water to pass from saturation pressure to the nozzle outlet pressure;
- the intermediate chamber is a transition chamber in which the pressurized water approaches saturation pressure by absorbing 5 to 30% of the available pressure and
- the outlet pipe consists of a sudden pressure reduction and cavitation confinement pipe, whose minimum length substantially corresponds to the distance separating the end of said pipe on the second pressure reduction stage side from the point of reattachment of the jets onto the walls of the pipe, with an angle of divergence $\alpha$ of the jets, before reattachment, between 3 and 12°, preferably between 6 and 9°.

According to one characteristic of this invention, the first and second pressure reduction stages are produced in the form of a diaphragm comprising one or more orifices of any shape, the hydraulic diameter of the orifice of the first stage, or of the equivalent orifice if this stage comprises several orifices, being greater than the hydraulic diameter of the orifice of the second stage, or of the equivalent orifice if this stage comprises several of them.

According to another characteristic of the invention, the pressure reduction $d_1$ is carried out by means of a valve, a baffle or any other flow restriction device.

According to another characteristic of the invention, the intermediate or transition chamber has a height, i.e. a distance separating the first pressure reduction stage from the second stage, which is less than the diameter of the orifice of the first pressure reduction (or of the equivalent orifice if this stage comprises several orifices), preferably equal to half this diameter.

Other characteristics and advantages of the present invention will emerge from the following description with reference to the attached drawings illustrating an example of its embodiment as well as the results obtained.

Figure 2:
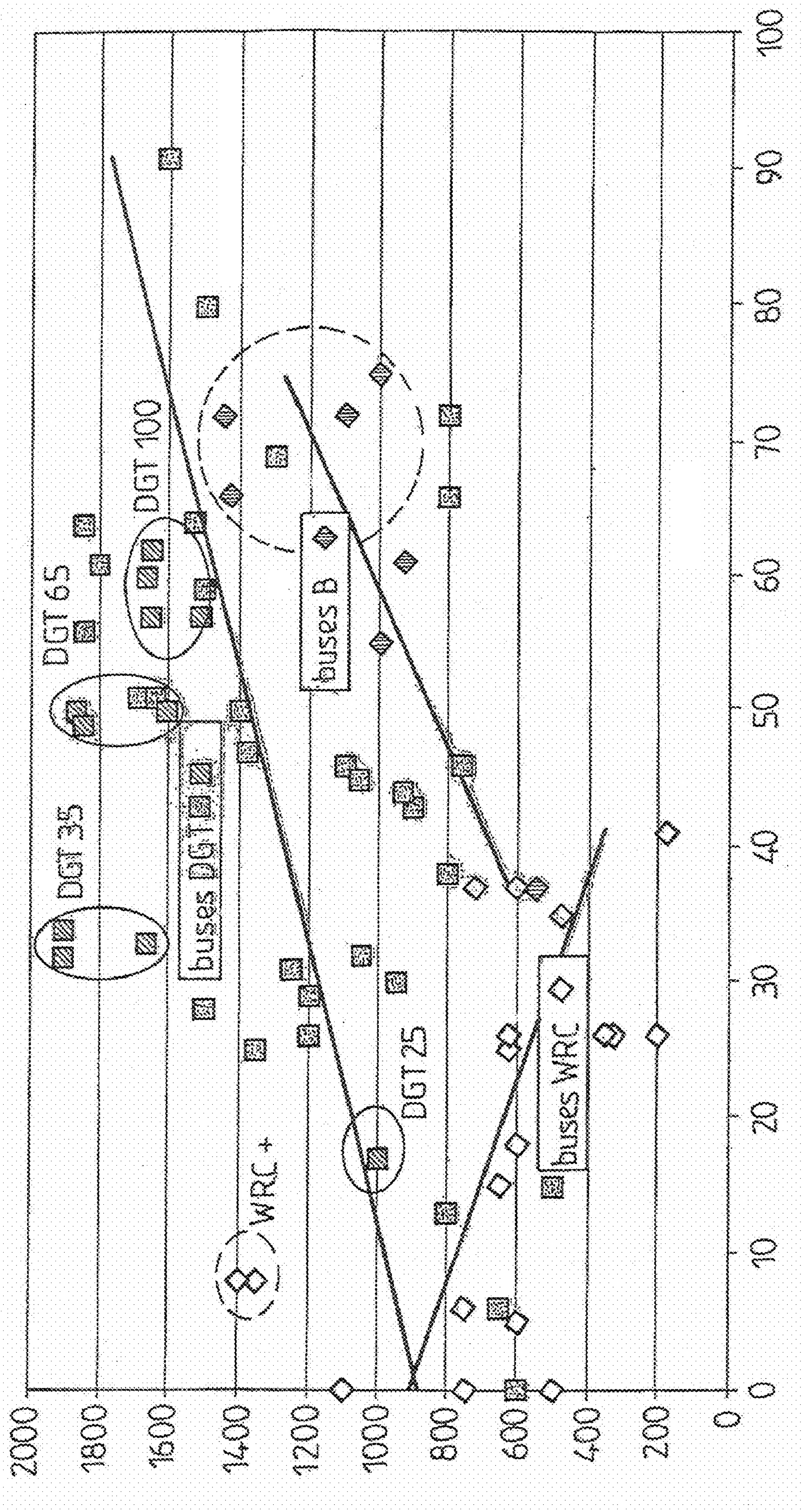
Figure 3:
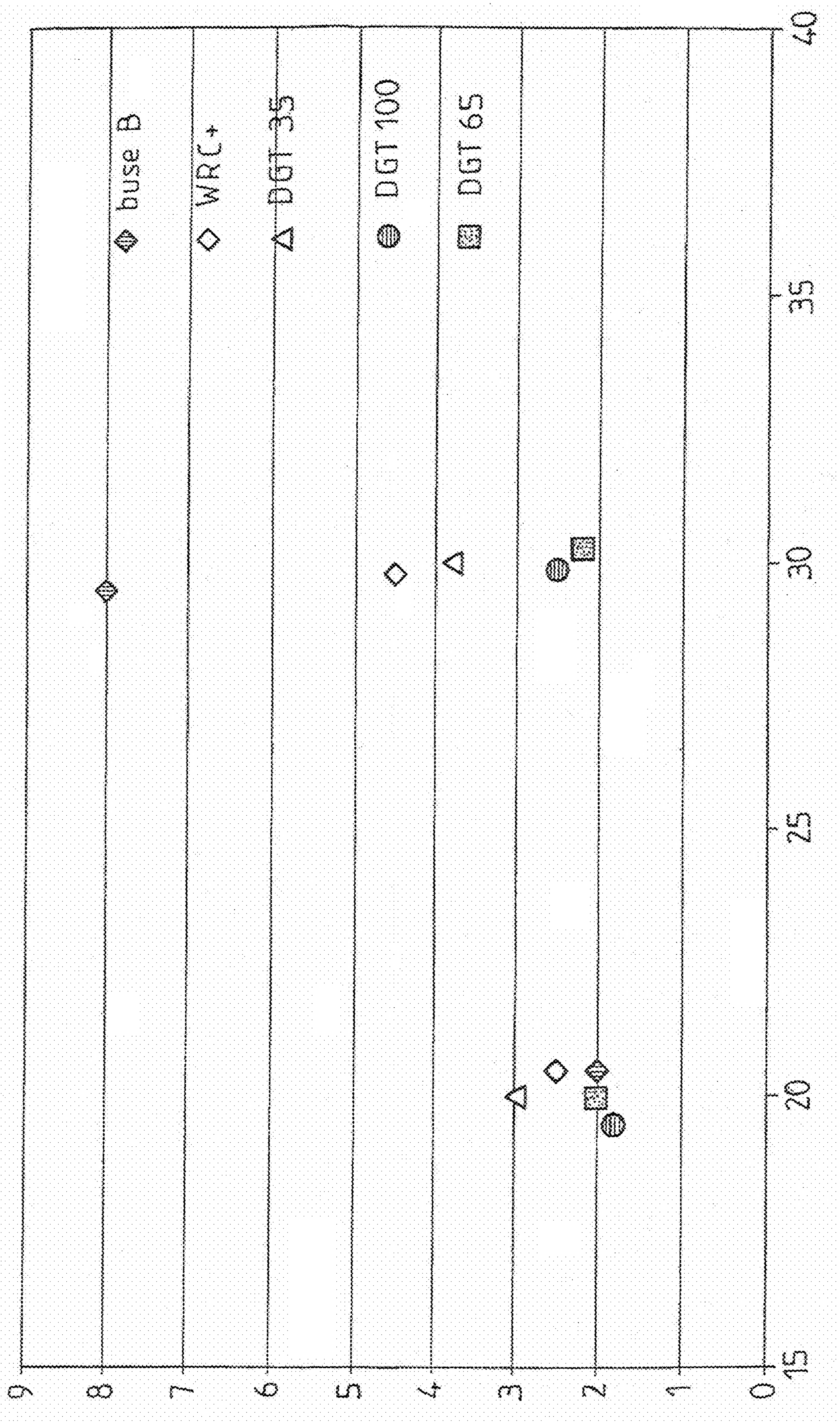

In these drawings:

FIG. 1 is a diagram showing an axial vertical section of a nozzle according to the present invention;

FIG. 2 relates to laboratory experiments and illustrates the results provided by the invention with respect to those obtained with the aid of nozzles according to the prior state of the art recalled above and FIG. 3 expresses industrial data that illustrate the results provided by the invention with respect to those obtained with the aid of nozzles according to this prior state of the art.

Referring to the drawings, it can be seen that the nozzle according to the present invention comprises a first pressure reduction stage 1 produced here in the form of a diaphragm comprising an orifice of diameter d1, an intermediate or transfer chamber 3, a second pressure reduction stage 2 comprising two or more orifices (the equivalent hydraulic diameter of these orifices being equal to d2), and an outlet pipe 4.

Thus, according to the invention, the diaphragm forming the pressure reduction of a stage may comprise one or more orifices. If it comprises several orifices (as is the case of the second pressure reduction stage 2 of this example of embodiment), the hydraulic diameter d (or d2 in this example of embodiment), is the equivalent diameter of an orifice whose area is equal to the sum of the areas of the orifices of this diaphragm.

As mentioned above, the first pressure reduction stage 1, creates a simple preliminary pressure reduction, the objective being that upstream of the second pressure reduction stage 2, the pressure should be close to the saturation pressure of the pressurized water. The hydraulic diameter d1 of the flow restriction system orifice forming this first stage 1 is greater than that of the hydraulic diameter d2 of the orifice of the diaphragm forming the second stage 2 (or of the equivalent orifice when this diaphragm comprises several orifices as is the case of the mode of embodiment illustrated by FIG. 1). In preference, d1 is equal to 1.5 d2. In this stage the pressure loss is of the order of 5 to 35%, preferably of the order of 15%.

In the transfer chamber 3, the gas (primarily air) must not be desorbed. There is a kind of continuity with the first pressure reduction stage 1 and, according to the present invention, the height of the chamber 3 must be less than the equivalent hydraulic diameter of the orifice of the flow restriction system of the first pressure reduction stage 1, this height e being the distance separating the two pressure reduction stages as seen in FIG. 1. This intermediate transfer chamber 3 forms a transition chamber for approaching saturation. The pressure loss obtained in this chamber 3 is of the order of 5 to 30%.

The second pressure reduction stage, 2, is, according to the present invention, the only effective pressure reduction that causes the pressurized water to pass from saturation pressure to the nozzle outlet pressure (height of immersion of the nozzle). As mentioned above, the hydraulic diameter d2 of the orifice (or of the equivalent orifice) of the diaphragm forming this stage 2 is always less than that of the first stage 1 and preferably about 1.5 times smaller. The pressure loss obtained thanks to this second pressure reduction stage 2 is of the order of 60 to 90%, preferably 70%. The objective is to concentrate the whole pressure reduction and generation of microbubbles at one point. This second pressure reduction stage 2 has sudden widening, the outlet angle of the orifice or orifices of the diaphragm forming it being level (180°) or between 90 and 270°.

Microbubbles are generated in the outlet pipe 4, which enables two phenomena to be produced:

- a sudden expansion (not divergent)
- a zone of effective cavitation (absolute pressure=0) maintained behind the second pressure reduction stage 2.

These phenomena are achieved if the second pressure reduction is sudden (without divergent or divergent with an angle at the center<90° or >270°) and if the pipe has a sufficient length for the negative pressure zone not to be supplied by the liquid outside the nozzle. According to the invention, this length L is a function of the diameter of the pipe and basically the distance between the outer wall of the jet or jets and the inner wall of the pipe. According to the invention, and as seen clearly in FIG. 1, the minimum length L of the pipe 4 substantially corresponds to the distance separating the end of said pipe on the second pressure reduction stage 2 side from the point of reattachment of the jets onto the walls of the pipe, with an angle of divergence $\alpha$ of the jets, before reattachment, between 3 and 12° preferably between 6 and 9°.

According to the present invention, in order to achieve good closure of this cavitation zone, it is necessary that the diaphragm forming the second pressure reduction stage 2 comprises either a single central orifice of any shape (circular, square, rectangular, elliptical), or several orifices situated at an equal distance from the center of the diaphragm.

The pipe may terminate with a trumpet-shaped end divergent 5 so as to improve performances and reduce the outlet speed. This characteristic brings two advantages:

Better reattachment of the liquid flow or flows and therefore better closure of the cavitation zone.

Slowing down of nozzle outlet speeds compatible with the mechanical strength of the flocs.

This type of embodiment enables more large bubbles to be generated than WRC nozzles, but the microbubbles are finer.

These nozzles have been characterized in the laboratory then tested on industrial devices in a production situation.

Test Results and Performances

1) Laboratory Tests

About fifty nozzles were tested. These nozzles were derived from the following types:

Nozzles hereafter designated by B comprising a pressure reduction followed by a divergent section for slowing the speed;

WRC type nozzles, which have been described above, and

Nozzles forming the subject of the present invention, designated by the reference DGT.

Their delivery rate is approximately 1.5 m3/h. They are supplied with water by a pressurization tank under $5.10^5$ Pa. The nozzles are immersed in a transparent vessel with a capacity of one $m^3$ where a number of measurements are made:

Quantity of large bubbles generated by the nozzle. This delivery rate is compared as a % with the effective quantity of air dissolved in the tank.

Quality of the microbubble emulsion. A special measurement by turbidimeter is used to assess the overall quality of the microbubbles. Strong turbidity corresponds to more numerous and/or finer microbubbles.

Speed at the nozzle outlet. The objective is to obtain the lowest speed.

The curves shown in FIG. 2 display the results obtained in microbubble emulsion turbidity and in % of large bubbles. The best nozzle is normally the nozzle that generates the least large bubbles and that has the densest emulsion.

The results show that:

WRC nozzles generate few large bubbles, but the density of the microbubble emulsion is low.

B and DGT nozzles (according to the invention) generate more large bubbles and paradoxically display a denser emulsion. The more large bubbles there are, the denser the emulsion, since the quantity of available air is small, the increase in density is only explained by finer microbubbles. The DGT nozzle according to the present invention is higher performing than the B nozzle over the 2 parameters.

The figures associated with DGT nozzles (25, 35, 65, 90) correspond to the lengths L in mm of the pipes 4 fitted with a trumpet end 5 (black squares). It is confirmed that an inadequate length 25 mm does not allow a dense emulsion to be generated. It is necessary to have a length of at least 35 mm for the liquid flows to reattach onto the walls and in the end to obtain a quality emulsion. In view of the fact that the diaphragm forming the second pressure reduction stage 2 comprised 3 orifices, the jet diffusion angle $\alpha$ for reattaching to the wall in 35 mm is between 6 to 9° (12 to 18° at the center). Too great a length increases the quantity of large bubbles probably by friction. The quality of the emulsion tends to diminish.

The performances of the DGT nozzles according to the present invention, with outlet pipes 4 lacking any trumpet, are represented by light squares. The trumpet ends 5 increase turbidity by 5% to 20% and reduce the nozzle outlet speeds by 10 to 40%.

In conclusion, the best nozzles seem to be the improved WRC+ nozzle (small quantity of large bubbles and correct turbidity) and the DGT 35 and DGT 65 nozzles (high density of emulsion despite a high level of large bubbles).

2) Tests on Industrial Flotation Units

These tests were carried out on a large drinking water plant comprising five flotation units working in parallel, under the same conditions, each being equipped with nozzles of a different type.

Except for the "B" nozzle taken as a reference, the nozzles adopted all equipped with outlet pipes with trumpet ends were the following:

B nozzle

WRC+ nozzle

DGT 35 nozzle

DGT 65 nozzle

DGT 100 nozzle

On difficult water and for 2 tested delivery rates (speed per surface area of separation by flotation: 20 m3/m2/h and 30 m3/m2/h) the results, obtained as turbidity of the flotated water and as speed on the flotation unit, are set out in FIG. 3.

Examination of FIG. 3 shows that:

All the nozzles give more or less sufficient quantities of microbubbles at 20 m/h (pressurization level=13%).

At 30 m/h and with a pressurization level of 8.5%, the difference between nozzles clearly appears:

The B nozzles fall behind through a lack of microbubbles probably due to an excess of large bubbles.

The WRC+ nozzles lose in efficiency doubtless because their microbubbles are larger overall.

Only the DGT65 and DGT 100 nozzles do not fall behind with speed. These are therefore the nozzles that generate the greatest quantity of microbubbles. The length of the DGT 35 divergent is insufficient to generate microbubbles of the same quality.

In conclusion, it appears that, surprisingly, the nozzle that generates five times more large bubbles (50% against 10%) is finally the highest performing nozzle in flotation. This is probably due to the fact, as has already been mentioned, that the microbubbles generated are smaller. The conditions of generation of these microbubbles are a sudden pressure reduction with the formation of a cavitation zone that is not re-supplied thanks to a sufficiently long, diverging, trumpet-ended pipe.

Of course, the present invention is not limited to the examples of embodiment or implementation disclosed and/or mentioned above, but encompasses all variants thereof. Thus, in particular, the hydraulic diameter d1 of the orifice of the first pressure reduction stage 1 or of the equivalent orifice if this stage comprises several orifices, may be between 1.6 and 1.1 times the diameter of the orifice of the second pressure reduction stage or of the equivalent orifice if this stage comprises several orifices.

The invention claimed is:

1. A method for generating microbubbles using a pressurized water releasing nozzle in a flotation plant, the method comprising the steps:

forming within the nozzle a first pressure reduction stage defined by an inlet and an axially displaced diaphragm having at least one orifice;

forming within the nozzle an intermediate transfer chamber downstream and adjacent to the first diaphragm;

forming within the nozzle a second pressure reduction stage axially displaced downstream of the intermediate transfer chamber and defined by a second diaphragm having at least one orifice and a space immediately downstream of the a second diaphragm;

forming a cylindrical outlet pipe section connected to the second pressure reduction stage, the pipe section formed with a minimum length corresponding to the distance between the second diaphragm and a cylindrical end portion of the pipe section;

further forming, downstream of the at least one orifice in the second diaphragm, a diverging jet from the at least one orifice, the divergence angle with respect to an axis of the orifice being between 3° and 12°;

the hydraulic diameter of the at least one orifice of the first stage diaphragm being greater than the hydraulic diameter of the at least one orifice of the second stage diaphragm;

immersing the nozzle in liquid of the flotation plant;

supplying pressurized water to the nozzle inlet;

performing a preliminary pressure reduction at the first pressure reduction stage by absorbing 5 to 20% of available pressure therein;

subjecting the pressurized water to transition in the intermediate chamber wherein the water therein approaches saturation pressure by absorbing 5 to 30% of available pressure in the intermediate chamber;

performing most of the pressure reduction in the second pressure reduction stage, for causing pressurized water to pass from a saturation pressure to a nozzle outlet pressure; and subjecting water to further pass through the outlet pipe wherein is it subjected to a sudden pressure reduction and cavitation.

2. The method as claimed in claim 1, wherein the intermediate transfer chamber is formed with an axial distance, separating the first pressure reduction stage from the second stage, which is less than the hydraulic diameter of the at least one orifice of the first pressure reduction stage diaphragm.

3. The method as claimed in claim 1, wherein the orifices of the diaphragm of the second stage are respectively situated at an equal distance from the center of a corresponding diaphragm.

4. The method as claimed in claim 1, wherein the hydraulic diameter of the at least one orifice of the first pressure reduction stage is between 1.6 and 1.1 times the hydraulic diameter of the at least one orifice of the second pressure reduction stage.

5. The method as claimed in claim 1, wherein the outlet pipe is formed to terminate in a trumpet-shaped divergent end.

* * * * *